United States Patent
Lannutti et al.

(10) Patent No.: US 8,529,387 B2
(45) Date of Patent: Sep. 10, 2013

(54) PULLEY WITH ASYMMETRIC TORQUE-SENSITIVE CLUTCHING

(75) Inventors: Anthony E. Lannutti, Fayetteville, AR (US); Kevin Dutil, Bentonville, AR (US)

(73) Assignee: Dayco IP Holdings, LLC, Springfield, MO (US)

( * ) Notice: Subject to any disclaimer, the term of this patent is extended or adjusted under 35 U.S.C. 154(b) by 755 days.

(21) Appl. No.: 12/713,580

(22) Filed: Feb. 26, 2010

(65) Prior Publication Data

US 2010/0147646 A1    Jun. 17, 2010

Related U.S. Application Data

(63) Continuation-in-part of application No. 12/112,393, filed on Apr. 30, 2008, now Pat. No. 7,931,552.

(51) Int. Cl.
    *F16H 9/00*    (2006.01)
(52) U.S. Cl.
    USPC ............... 474/74; 474/70; 474/73; 474/84; 192/113.32
(58) Field of Classification Search
    USPC ......... 474/73, 74, 32, 35, 84, 86, 70; 192/45, 192/110 B, 113.32, 41 S, 113.34
    See application file for complete search history.

(56) References Cited

U.S. PATENT DOCUMENTS

| | | | |
|---|---|---|---|
| 2,499,219 A | * | 2/1950 | Hemmeter ................ 192/224.1 |
| 4,483,430 A | * | 11/1984 | Carmichael et al. ....... 192/85.53 |
| 4,509,933 A | | 4/1985 | Miranti, Jr. et al. |
| 4,541,516 A | * | 9/1985 | Fenzel ...................... 192/85.53 |

(Continued)

FOREIGN PATENT DOCUMENTS

| | | |
|---|---|---|
| DE | 4300178 | 4/1994 |
| EP | 1277989 | 2/2003 |

(Continued)

OTHER PUBLICATIONS

PCT, International Search Report and Written Opinion, International Application No. PCT/US2009/041573 (Jun. 11, 2009).

(Continued)

*Primary Examiner* — Emmanuel M Marcelo
(74) *Attorney, Agent, or Firm* — Thompson Hine, L.L.P.

(57) ABSTRACT

A pulley assembly for use in an automobile accessory drive system includes a shaft engaging hub, a pulley member, a nut treaded onto the shaft engaging hub, and a brake member interposed between the pulley member and the nut. The shaft engaging hub is engaged with an accessory input shaft for rotation therewith. Frictional engagement between the pulley member, the brake member, and the nut transfers torque from the pulley member to the input shaft. The pulley member includes an inner coupling surface and a peripheral belt-engaging surface. The nut includes an outer coupling surface. The brake member includes a first coupling surface in frictional engagement the outer coupling surface of the nut and a second coupling surface in frictional engagement with the inner coupling surface of the pulley member. When torque is applied to the nut in a first direction the out coupling surface of the nut couples to the inner coupling surface of the brake member such that the hub and the nut rotate with the pulley member. The outer coupling surface of the nut and the inner coupling surface of the brake member decouple when torque applied to the nut is in a second direction opposite the first direction such that the hub rotates relative to the pulley member.

24 Claims, 5 Drawing Sheets

(56) References Cited

U.S. PATENT DOCUMENTS

| | | | |
|---|---|---|---|
| 4,583,962 A | 4/1986 | Bytzek et al. | |
| 4,596,538 A | 6/1986 | Henderson | |
| 4,661,087 A | 4/1987 | Henderson | |
| 4,662,861 A | 5/1987 | Seung et al. | |
| 4,698,049 A | 10/1987 | Bytzek et al. | |
| 4,822,322 A | 4/1989 | Martin | |
| 4,826,471 A | 5/1989 | Ushio | |
| 4,832,665 A | 5/1989 | Kadota et al. | |
| 4,869,353 A | 9/1989 | Ohtsuki et al. | |
| 4,878,885 A | 11/1989 | Brandenstein et al. | |
| 4,971,589 A | 11/1990 | Sidwell et al. | |
| 5,015,217 A | 5/1991 | Henderson | |
| 5,035,679 A | 7/1991 | Green et al. | |
| 5,057,059 A | 10/1991 | Sidwell et al. | |
| 5,096,035 A | 3/1992 | Bradfield | |
| 5,149,306 A | 9/1992 | Sidwell et al. | |
| 5,209,705 A | 5/1993 | Gregg | |
| 5,215,504 A | 6/1993 | Wong et al. | |
| 5,234,385 A | 8/1993 | Kawashima et al. | |
| 5,250,009 A | 10/1993 | Sidwell et al. | |
| 5,334,109 A | 8/1994 | Izutsu et al. | |
| 5,370,585 A | 12/1994 | Thomey et al. | |
| 5,382,198 A | 1/1995 | Janne | |
| 5,478,285 A | 12/1995 | Bakker et al. | |
| 5,558,370 A | 9/1996 | Behr | |
| 5,575,727 A | 11/1996 | Gardner et al. | |
| 5,598,913 A | 2/1997 | Monahan et al. | |
| 5,620,385 A | 4/1997 | Cascionale et al. | |
| 5,692,482 A | 12/1997 | Shimizu et al. | |
| 5,772,549 A | 6/1998 | Berndt et al. | |
| 5,795,257 A | 8/1998 | Giese et al. | |
| 5,803,850 A | 9/1998 | Hong et al. | |
| 5,827,143 A | 10/1998 | Monahan et al. | |
| 6,004,235 A | 12/1999 | Ohta et al. | |
| 6,044,943 A | 4/2000 | Bytzek et al. | |
| 6,083,130 A | 7/2000 | Mevissen et al. | |
| 6,161,841 A | 12/2000 | Shaw | |
| 6,193,040 B1 | 2/2001 | Cerny | |
| 6,217,470 B1 | 4/2001 | Quintus | |
| 6,231,465 B1 | 5/2001 | Quintus | |
| 6,264,578 B1 | 7/2001 | Ayukawa | |
| 6,361,459 B1 | 3/2002 | Serkh et al. | |
| 6,375,588 B1 | 4/2002 | Frankowski et al. | |
| 6,394,247 B1 | 5/2002 | Monahan et al. | |
| 6,394,248 B1 | 5/2002 | Monahan et al. | |
| 6,422,962 B1 | 7/2002 | Lehtovaara et al. | |
| 6,478,118 B2 | 11/2002 | Astrom et al. | |
| 6,554,318 B2 | 4/2003 | Kohut et al. | |
| 6,571,924 B2 | 6/2003 | Murata et al. | |
| 6,582,332 B2 | 6/2003 | Serkh | |
| 6,588,560 B1 | 7/2003 | Fujiwara | |
| 6,592,482 B2 | 7/2003 | Serkh | |
| 6,609,988 B1 | 8/2003 | Liu et al. | |
| 6,637,570 B2 | 10/2003 | Miller et al. | |
| 6,652,401 B2 | 11/2003 | Liu | |
| 6,834,631 B1 | 12/2004 | Blackburn et al. | |
| 6,863,631 B2 | 3/2005 | Meckstroth et al. | |
| 6,893,368 B2 | 5/2005 | Fujiwara et al. | |
| 7,104,909 B2 | 9/2006 | Asbeck et al. | |
| 7,186,196 B2 | 3/2007 | Quintus | |
| 7,347,309 B2 | 3/2008 | Wiesneth et al. | |
| 7,367,908 B2 | 5/2008 | Lemberger et al. | |
| 7,448,972 B2 | 11/2008 | Garabello et al. | |
| 7,644,814 B2 | 1/2010 | Beattie | |
| 7,867,119 B2 * | 1/2011 | Brunetiere | 474/84 |
| 2002/0119850 A1 | 8/2002 | Dutil | |
| 2003/0008739 A1 | 1/2003 | Asbeck et al. | |
| 2003/0098215 A1 | 5/2003 | Miller et al. | |
| 2004/0112700 A1 | 6/2004 | Liston et al. | |
| 2004/0171448 A1 | 9/2004 | Lemberger et al. | |
| 2007/0010361 A1 | 1/2007 | Kobelev et al. | |
| 2007/0021253 A1 | 1/2007 | Kobelev et al. | |
| 2007/0066426 A1 * | 3/2007 | Kamdem et al. | 474/94 |
| 2008/0112658 A1 | 5/2008 | Justin | |
| 2008/0194366 A1 | 8/2008 | Mevissen et al. | |
| 2008/0293527 A1 | 11/2008 | D'Amicantonio et al. | |
| 2009/0272618 A1 | 11/2009 | Pendergrass et al. | |
| 2009/0275432 A1 | 11/2009 | Dell | |
| 2010/0147646 A1 | 6/2010 | Lannutti et al. | |

FOREIGN PATENT DOCUMENTS

| | | |
|---|---|---|
| EP | 1596098 | 11/2005 |
| EP | 1754914 | 2/2007 |
| JP | 115251/78 | 2/1952 |
| JP | 45040/80 | 9/1953 |
| JP | 02089838 | 3/1990 |
| JP | 02102956 | 4/1990 |
| JP | 05272606 | 10/1993 |
| JP | 7-190085 | 7/1995 |
| JP | 2000-227128 | 8/2000 |
| WO | 2004/109247 | 12/2004 |

OTHER PUBLICATIONS

PCT, International Preliminary Report on Patentability, International Application No. PCT/US2009/041573 (Oct. 20, 2010).

US, Office Action, U.S. Appl. No. 12/112,393 (Sep. 1, 2010).

US, Notice of Allowance, U.S. Appl. No. 12/112,393 (Dec. 17, 2010).

PCT, International Search Report and Written Opinion, International Application No. PCT/US2011/023541 (Apr. 1, 2011).

PCT, International Search Report and Written Opinion, International Application No. PCT/US2012/029320 (Jun. 8, 2012).

US, Office Action, U.S. Appl. No. 12/786,825 ( Jul. 18, 2012).

CA, Office Action, Canadian Application No. 2,723,044, dated Aug. 1, 2011.

PCT, International Search Report and Written Opinion, International Application No. PCT/US2011/036009, dated Aug. 15, 2011.

US, Office Action, U.S. Appl. 12/786,825 ( Nov. 2, 2012).

US, Advisory Action, U.S. Appl. No. 12/786,825 (Jan. 11, 2013).

KR, Notice of Preliminary Rejection, Korean Application No. 7024789/2010 (Oct. 17, 2012).

English translation of Office Action (Notice of Reason(s) for Rejection), Japanese Application No. 2011-507546 (Feb. 26, 2013).

* cited by examiner

PULLEY WITH ASYMMETRIC TORQUE-SENSITIVE CLUTCHING

CROSS-REFERENCE TO RELATED APPLICATIONS

This application is a continuation-in-part of application Ser. No. 12/112,393, which was filed on Apr. 30, 2008.

TECHNICAL FIELD

The present application relates generally to pulleys and more particularly to a pulley assembly that utilizes torque-sensitive clutching in response to relative torque-reversals.

BACKGROUND

It is known to drive various automobile accessory assemblies, including for example a water pump, an alternator/generator, a fan for cooling coolant, a power steering pump, and a compressor, using the vehicle engine. In particular, a driving pulley actuated by an engine shaft of the motor vehicle drives an endless drive belt that in turn drives the accessory assemblies through driven pulleys.

Periodic torque pulses initiated by, for example, combustion engine firing can create significant speed transitions which can interrupt smooth operation of the driven components. In addition, inertial and driven speed transitions associated with startup, shutdown, jake braking, gear shifting, etc. can also interrupt operation of the driven components. These transitions can result in undesirable effects such as belt jump, belt wear, bearing wear, noise, etc.

SUMMARY

An improved driven pulley assembly is proposed that utilizes torque-sensitive clutching to permit one-way relative motion between the input shaft of a driven accessory and the outer driven sheave of the pulley assembly. When the sheave of the pulley assembly is being driven in the predominant direction of rotation, the clutching mechanism of the pulley assembly engages and drives the accessory input shaft for the desired smooth rotation. When relative torque reversals occur as a result of, for example, driven speed transitions, the internal clutching mechanism of the proposed pulley assembly disengages the driven accessory shaft from the outer driven sheave, thereby permitting the driven shaft to continue to rotate with momentum in the predominant direction of rotation.

The improved pulley assembly, according to one aspect, includes a shaft engaging hub for engagement with an accessory input shaft, a pulley member for engagement with a driving belt, a nut that is threadably engaged with the shaft engaging hub, and a brake member that transfers torque between the pulley member and the nut. The shaft engaging hub has an axis of rotation, an outer threaded surface, and a bore for receiving an accessory input shaft. The pulley member has an outer peripheral belt-engaging surface and a bore with an inner coupling surface. The nut includes an inner threaded surface that is engaged with the outer threaded surface of the shaft engaging hub, and an outer coupling surface that is angled relative to the axis of rotation of the shaft engaging hub. The brake member, which is interposed between the pulley member and the nut, has a first coupling surface facing the outer coupling surface of the nut and a second coupling surface facing the inner coupling surface of the pulley member. When torque is applied to the nut in a first direction, the nut "tightens" onto the shaft engaging hub via their threaded connection and the outer coupling surface of the nut frictionally couples to the first coupling surface of the brake member such that the nut and the shaft engaging hub rotate with the pulley member. When torque is applied to the nut in a second direction opposite the first direction, the nut "loosens" on the shaft engaging hub thereby decoupling the first coupling surface of the brake member and the outer coupling surface of the nut such that the shaft engaging hub rotates relative to the pulley member.

The improved pulley assembly provides several advantages over similar devices designed to permit the overrunning of pulleys. First, by use of a steeply angled engagement between the friction surfaces of the nut and the brake member, the improved design achieves a large amount of clamping force and torque resistance through predominantly radial force with far less axial force. The reduced axial load results in easier deactivation of the treaded connection, even after high torque engagements, for improved responsiveness. Improved responsiveness means a lower break-away torque for deactivation in an over-running condition. Second, according to another aspect, the brake member may utilize non-parallel friction coupling surfaces for engaging with the nut and the pulley member respectively. This maximizes friction material surface area (thereby reducing wear rate) and reduces forces leading to misalignment. Third, in other embodiments, the addition of a ball bearing for rotational freedom under disengaged over-running not only provides improved structural rigidity, but also extends the life of the assembly by relieving wear on the pivot bushing. Fourth, in still other embodiments, the introduction of a composite break ring improves the durability of the assembly and increases the amount of torque and clamping force that can be applied.

Other advantages and features of the invention will be apparent from the following description of particular embodiments and from the claims.

DETAILED DESCRIPTION

Figure 1:
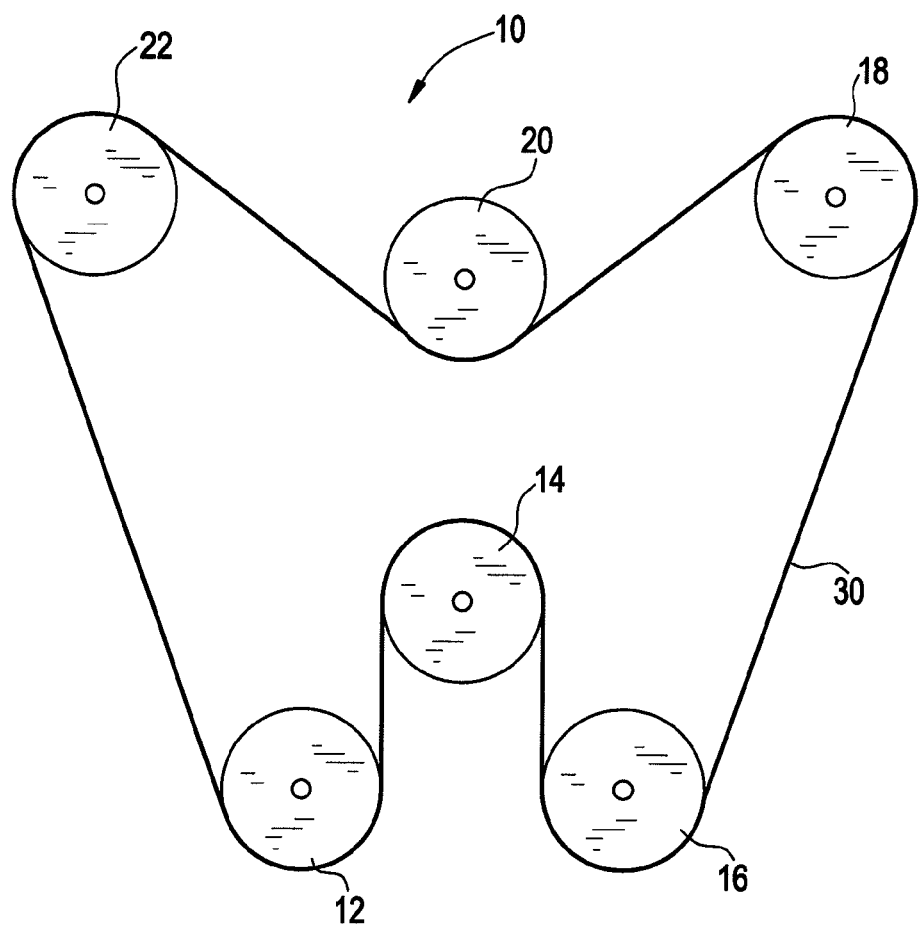
FIG. 1 is a diagrammatic view of an embodiment of an accessory drive system.

Referring to FIG. 1, an accessory drive system 10 of, for example, an internal combustion engine of an automobile includes an endless belt 30 that is used to drive a number of accessories. The various accessories are represented in FIG. 1 diagrammatically by their pulley assemblies. The belt 30 is entrained around a crank pulley assembly 12, a fan/water pump pulley assembly 14, a power steering pulley assembly 18, an idler pulley assembly 20 and a tensioner pulley assembly 22. In some embodiments, the tensioner pulley assembly 22 includes damping, such as asymmetric damping with a frictional damper to resist lifting of the tensioner arm away from the belt 30.

The various accessories are driven through use of pulley assemblies 14, 16, 18, 20 and 22 that are themselves rotated by the belt 30. For purposes of description, pulley assembly 16 of an alternator will be focused on below. It should be noted, however, that the other pulley assemblies of one or more of the other accessories may also operate in a fashion similar to that of pulley assembly 16.

Figure 2:
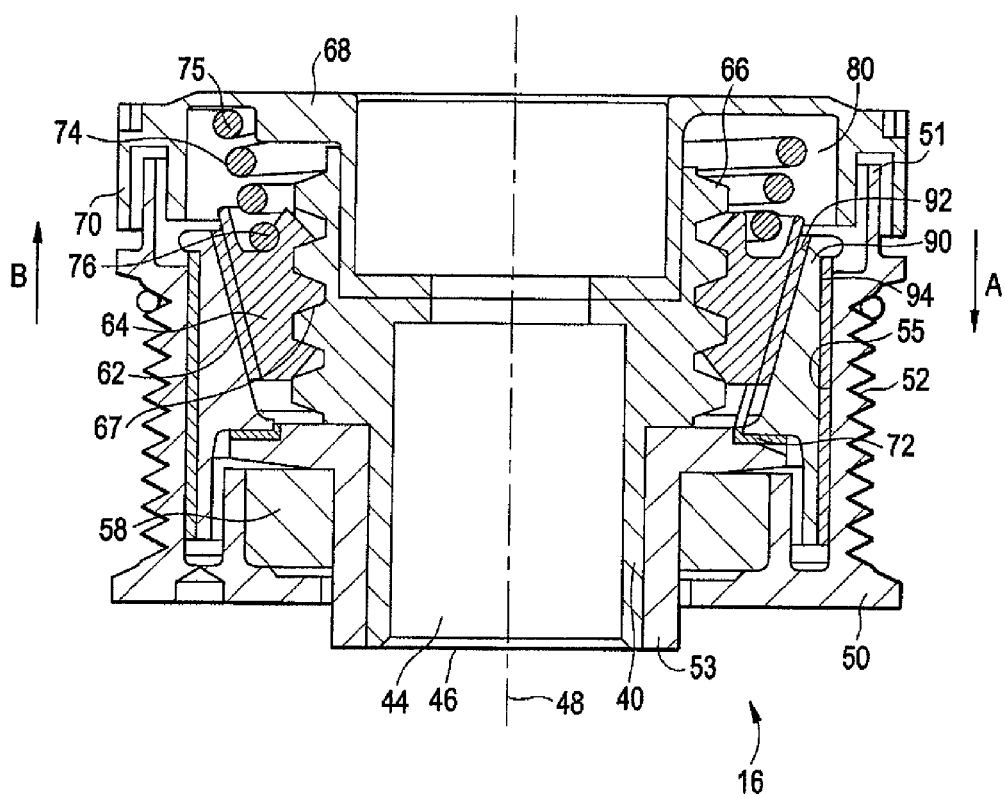
FIG. 2 is a side, section view of an embodiment of a pulley assembly for use in the accessory drive system of FIG. 1.
Figure 3:
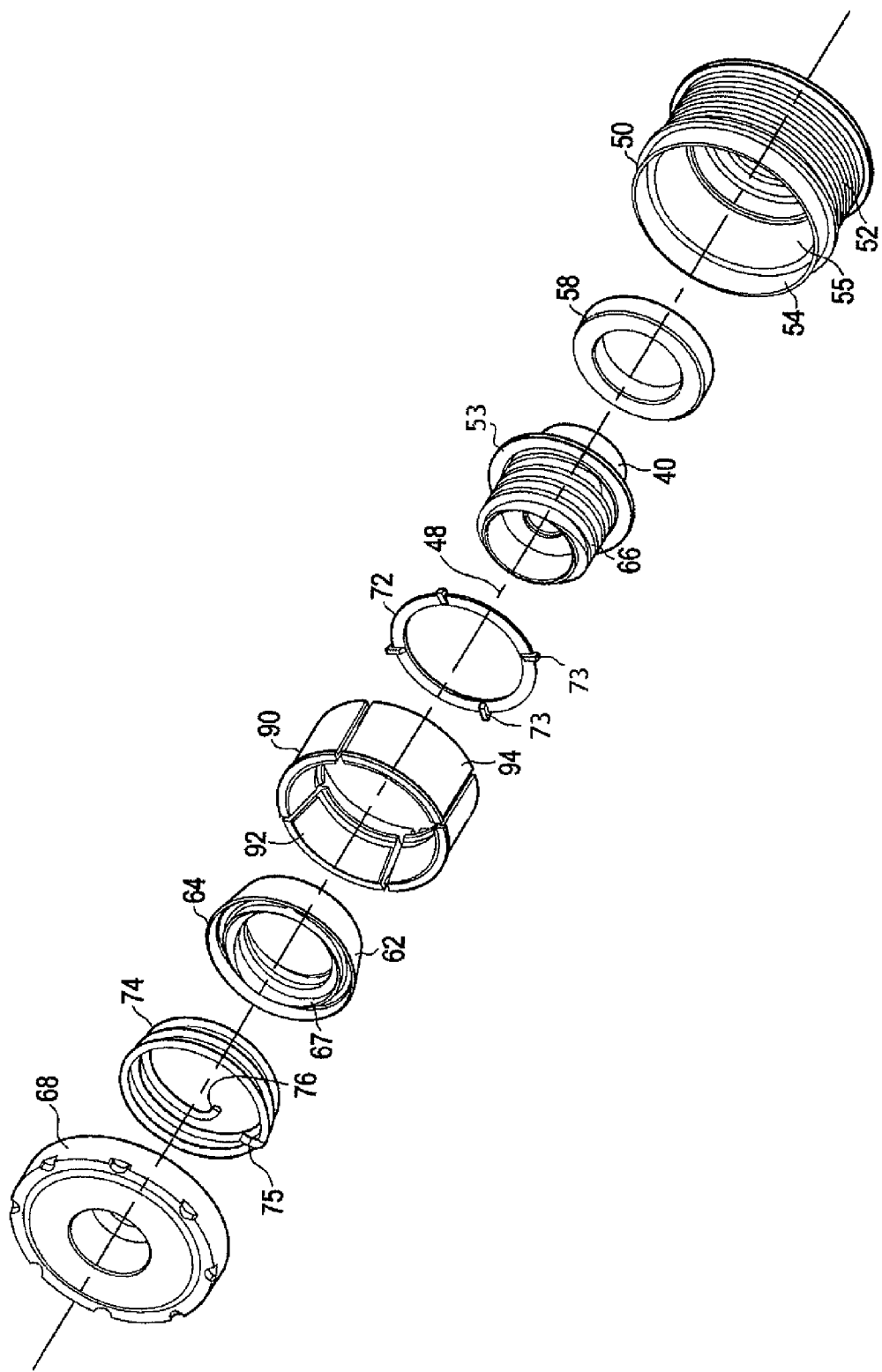
FIG. 3 is an exploded, perspective view of the pulley assembly of FIG. 2.
Figure 4:
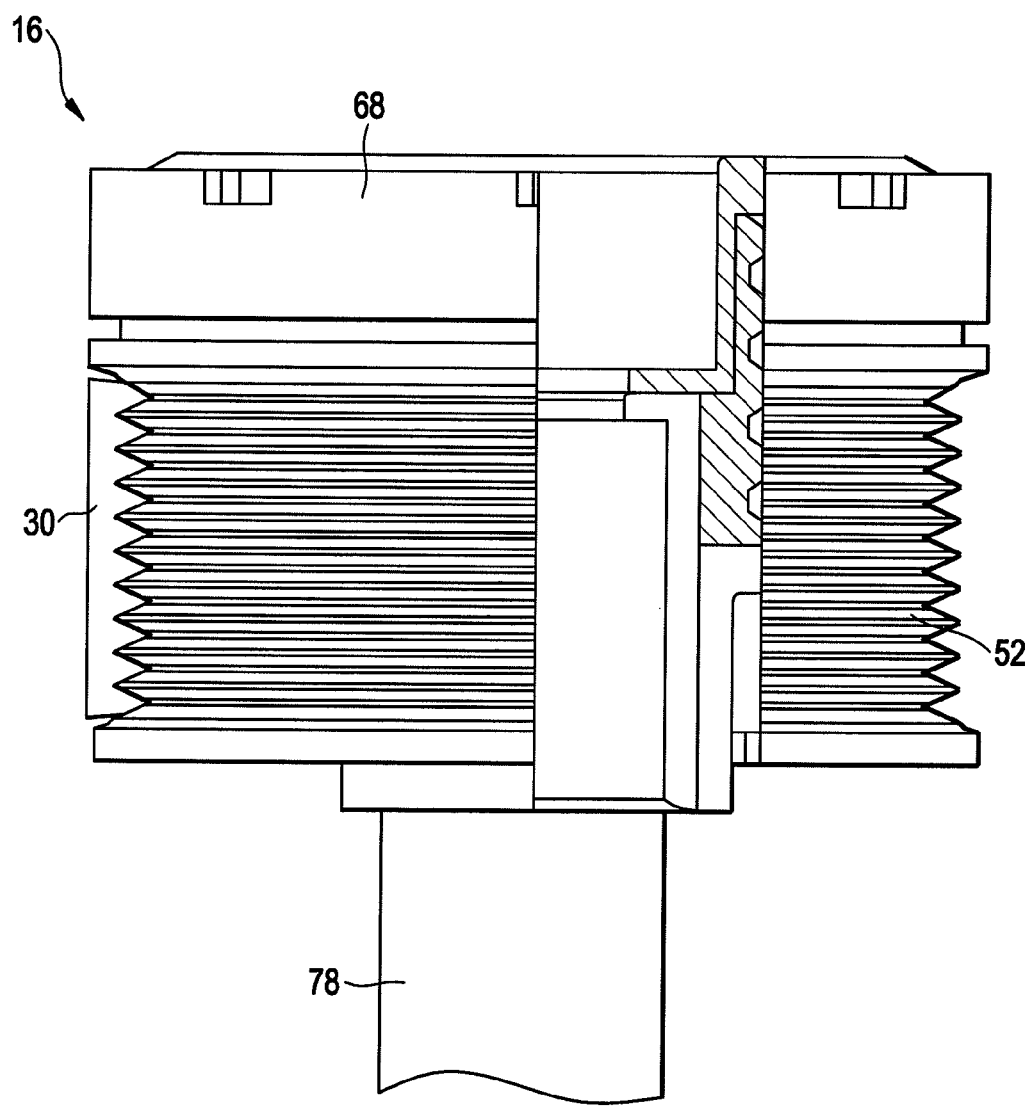
FIG. 4 is a side, partial section view of the pulley assembly of FIG. 2 connected to an input shaft of an alternator.

Referring now to FIGS. 2, 3, and 4, pulley assembly 16 transfers input torque to the input shaft of the alternator when rotated in a predominant rotational direction and also isolates the input shaft from relative torque reversals between the pulley assembly and the input shaft 78 of the alternator (FIG. 4). When such relative torque reversals between the pulley assembly 16 and the input shaft of the alternator occur, an internal clutching system of the pulley assembly 16 acts to disengage the alternator from the torque reversal, thereby permitting the alternator input shaft to continue rotating with momentum in the predominate operational direction. FIG. 4 illustrates the pulley assembly 16 connected to the input shaft 78 of the alternator and engaged with the belt 30.

The pulley assembly 16 includes a shaft engaging hub 40 with an axis of rotation 48, an outer threaded surface 66, and a bore 44 for receiving the input shaft of the alternator. The shaft engaging hub 40 may be mated to the input shaft of the alternator by a Woodruff key, as is well known, to prevent the shaft engaging hub 40 from freely rotating about the input shaft. Of course other connections between the shaft engaging hub 40 and the input shaft of the alternator are also possible including, for example, a spline. In some embodiments, an annular collar or sleeve 53 may be fitted over or coupled to the shaft engaging hub 40 at a location so as not to interfere with the outer threaded surface 66.

A pulley member 50 is located about the shaft engaging hub 40 and includes a central bore or opening 54 that is sized such that the pulley member can rotate about the hub. The pulley member 50 also includes an outer, peripheral belt-engaging surface 52 that engages belt 30, and an inner coupling surface 55. The inner coupling surface 55 may be made of or coated with a friction material so as to engage and transfer torque from pulley member 50 to other components. In the illustrated embodiment, the belt engaging surface 52 is profiled including V-shaped ribs and grooves to mate with corresponding ribs and grooves on the belt 30. Other configurations are possible, such as cogs, flat or rounded ribs and grooves.

In some embodiments, a roller bearing 58 may be located between the hub 40 and the pulley member 50 to permit stable rotation of the pulley member 50 relative to the hub 40 when disengaged. The inner race of the roller bearing 58 may be adjacent and coupled to the shaft engaging hub 40. The outer race of the roller bearing 58 may be adjacent and coupled to the pulley member 50. In an embodiment including a sleeve 53 over the hub 40, as in FIG. 2, the inner race of the roller bearing 58 may be adjacent and coupled to the sleeve 53 rather than the hub 40 directly. The use of a roller bearing may improve the overall structural rigidity of the assembly and extend the life of the assembly by reducing wear as elements of the clutching mechanism rotate relative to one another.

A nut 64 having an inner threaded surface 67 is threadably engaged with the outer threaded surface 66 of the shaft engaging hub 40 such that relative rotation of the nut 64 about the hub 40 in a first rotational direction causes the nut 64 to translate axially in a first linear direction A along the axis of rotation, while relative rotation of the nut 64 in the opposite direction causes it to translate axially in an opposite linear direction B. The nut 64 also includes an outer coupling surface 62 that is angled relative to the axis of rotation 48 of the shaft engaging hub 40. According to one embodiment, the acute angle formed between the nut's outer coupling surface 62 and the axis of rotation 48 of the hub 40 is between 5 and 45 degrees. In another embodiment, the angle between the outer coupling surface 62 and the axis of rotation 48 is preferably between about 10 to 20 degrees. The optimal angle depends, at least in part, on the coefficient of friction between materials engaged at the coupling surface, the helix or pitch angle of the nut's threaded surface 67, the coefficient of friction of the threads, and the engage/disengage torque requirement of the design.

Figure 5:
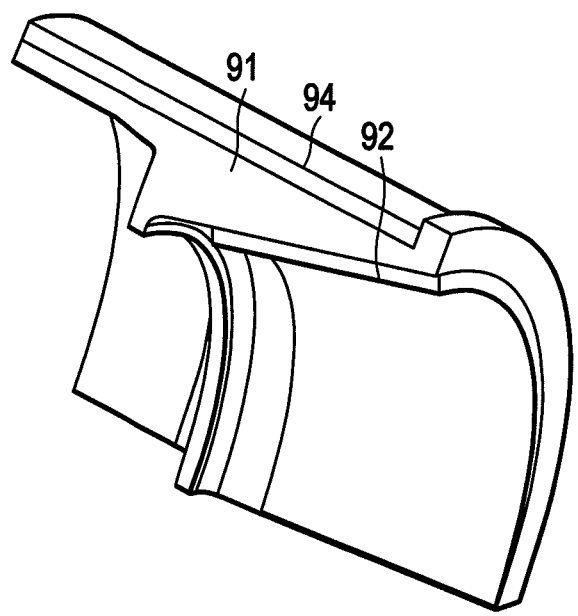
FIG. 5 is a perspective view of a brake shoe according to one embodiment.
Figure 6:
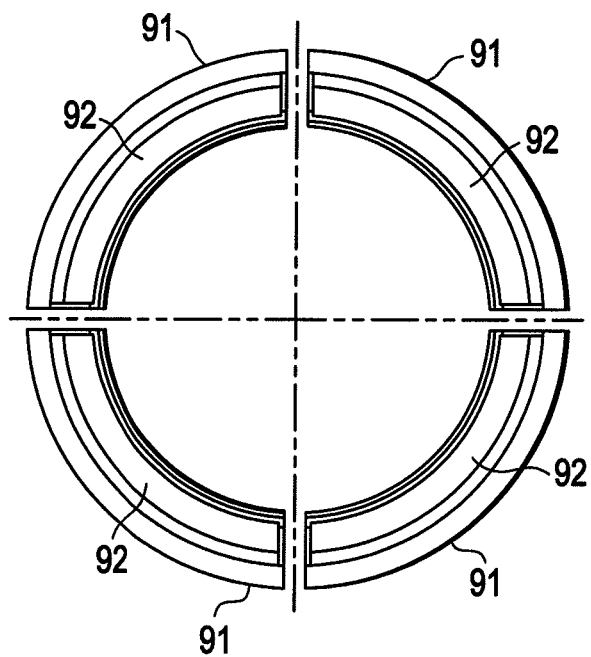
FIG. 6 is a top view of four arcuate brake shoes aligned to cooperatively form an annular brake member according to one embodiment.

Interposed between the pulley member 50 and the nut 64 is a brake member 90. As shown in FIGS. 5 and 6, the brake member 90 may be made of a plurality of arcuate brake shoes 91 that are arranged cooperatively around the outer circumference of the nut 64. According to another embodiment, the brake member 90 may be a continuous ring with one or more flexible fingers that allow the ring to expand or contract in response to the movement of the nut 64. The brake member 90 includes a first coupling surface 92 that faces the outer coupling surface 62 of the nut and a second coupling surface 94 that faces the inner coupling surface 55 of the pulley member 50. Cooperative frictional engagement between these facing pairs of coupling surfaces provides a clutching action between the pulley member 50 and the shaft engaging hub 40. In some embodiments, the brake member 90 may be a composite and the first and second coupling surfaces, 92, 94 may be made from or coated with a friction material. An annular pivot bushing 72 may also be positioned between the brake member 90 and the hub 40 or collar 53, if present. As shown in FIG. 3, the bushing 72 may include one or more spacers 73 to keep the brake shoes 91 of the brake member 90 properly positioned. The pivot bushing 72 may be made from a material having a very low coefficient of friction.

In the embodiment of FIG. 2, the first and second coupling surfaces 92, 94 of the brake member 90 are non-parallel. In particular, the second coupling surface 94 may be substantially parallel to the axis of rotation 48 of the shaft engaging hub 40, while the first coupling surface 92 may form substantially the same angle with the axis of rotation 48 as the angle formed between the outer coupling surface 62 of the nut and the axis of rotation 48 of the shaft engaging hub 40. By independently selecting a first angle of engagement between the first coupling surface 92 and the nut 64, on the one hand, and a second angle of engagement between the second coupling surface 94 and the pulley member 50 on the other hand, the brake member 90 is configured to maximize friction material surface area (thereby reducing wear rate), maximize the available clamping force, minimize the force required to break away in an over-run condition, and reduce forces leading to misalignment. In addition, the angles of engagement and frictional properties of the engaging surfaces can be selected to establish a maximum sustainable engagement torque (or "break-away torque") in the event the drive dynamics are excessive, even in the predominant rotational direction.

The engaging friction surfaces of the nut 64, brake member 90 and pulley member 50 may be formed from or coated with a friction material including known brake materials. Acceptable materials include, but are not limited to, non-asbestos molded materials with medium to high friction, good stability and good wear characteristics. At least one material that is suitable for the application comprises a flexible molded, two roll extruded, metal-free, phenolic bound friction lining containing cured rubber along with organic and inorganic friction modifiers and fillers. Selection of the friction material depends on the desired coefficient of friction and wear characteristics, which depends on the specific application and operating conditions.

In a first operating condition in which the pulley assembly 16 drives the input shaft 78, the belt 30 drives the pulley member 50 in a first rotational direction about the axis of rotation 48. In this condition, frictional engagement between the inner coupling surface 55 of the pulley member 50 and the second coupling surface 94 of the brake member 90 urges the brake member 90 to rotate in the first rotational direction. Further frictional engagement between first coupling surface 92 of the brake member 90 and the outer coupling surface 62 of the nut 64 in turn urges the nut 64 to rotate in the first direction. Rotation of the nut 64 in the first direction causes the nut 64 to translate axially along the axis of rotation 48 (in the direction of arrow A) via threaded engagement with the hub 40. As the nut 64 translates axially in direction A with direct contact to the brake member 90, the brake member 90 expands radially outwardly such that the contact pressure and friction force between the nut 64, the brake member 90, and the pulley member 50 increases to frictionally couple the nut 64 to the brake member 90 for rotation with the brake member 90 and the pulley member 50.

In a second operating condition, also referred to as an overrunning condition, the input shaft 78 disengages from the pulley member 50 and continues to rotate with momentum in the first rotational direction when the pulley member 50 experiences a relative torque reversal or sudden slowdown. In this condition, the pulley member 50 may continue to rotate in the first direction but with less angular velocity than the velocity at which it had been driving the input shaft 78. The sudden decrease of angular velocity at the pulley member 50 has the effect of a relative reversal of torque, which is translated from the pulley member 50 to the nut 64 through the brake member 90 via the previously described frictional engagements. The application of torque to the nut 64 in the second direction causes the nut to rotate in the second direction relative to the shaft engaging hub 40, even though in a absolute sense both the nut 64 and the hub 40 may continue to rotate in the first direction about the axis of rotation 48. Rotation of the nut 64 in the second direction relative to the hub 40 causes the nut 64 to loosen or translate axially away from the brake member 90 (in the direction of arrow B) via the threaded connection to the hub 40. As the contact pressure and friction force between the nut 64, the brake member 90, and the pulley member 50 decrease, they will eventually uncouple and rotate relative to one another with minimal friction such that the input shaft 78 rotates independently of the pulley member 50.

A cover plate 68 may be fastened to the pulley assembly 16 by any conventional means to contain the working components in a compact unit and protect them from damage and debris. In particular, the cover plate 68 may be fastened to the hub 40 or the input shaft 78 so as to rotate with those components. According to one embodiment, the cover plate 68 includes an outer, axially extending flange 70 that extends over and covers a flange 51 on the pulley member 50 to form a tortuous (i.e., indirect) path between the interior and exterior of the pulley assembly 16. Using such a configuration allows the pulley member 50 to rotate relative to the cover plate 68 and hub 40 while at the same time providing protection against contaminants and debris for the inner components of the pulley assembly 16.

According to another aspect, a torsion spring 74 may be located within a cavity 80 between the cover plate 68 and the nut 64 with a first end of the spring 75 engaged with the cover plate 68 and a second end of the spring 76 engaged with the nut 64. The torsion spring 74 may be preloaded to bias the nut 64 to rotate in the first direction about the treaded connection with the hub 40. Alternatively, the spring may simply load or wind up in response to axial movement of the nut 64 away from the brake member 90. The use of the torsion spring 74 improves the responsiveness of the clutching assembly and prevents the nut 64 from remaining disengaged from the brake member 90 after a relative torque reversal. Specifically, in the overrunning condition, the torque applied by the brake member 90 to the nut 64 in the second direction may be sufficient to overcome the torsion applied by the torsion spring 74 thus allowing the nut 64 to translate and decouple from the brake member 90. When the relative torque reversal event is over, the torsion spring 74 urges the nut 64 back into engagement with the brake member 90 so that the pulley member 50 can once again drive the hub 40 and input shaft 78. In other embodiments, an axial spring, rather than a torsional spring, may be used to bias the nut 64 down the treaded hub 40 into engagement with the brake member 90.

Various parameters can affect the operation, responsiveness, and performance of the pulley assembly 16 including the angle of the frictional coupling surfaces relative to the axis of rotation, the coefficients of friction of the coupling surfaces, the torsion spring force, the thread pitch and count of the treaded connection between the hub 40 and nut 64, and the coefficient of friction of the treaded connection. By significantly decreasing the acute angle formed between the frictional coupling surfaces and the axis of rotation, the new design provides very large clamping force and torque resistance through predominantly radial force with far less axial force. The reduction in axial load enables the treaded connection between the hub 40 and nut 64 to deactivate easier and more responsively to relative torque reversals. Optimization toward a target of 0 in-lb breakaway torque for overrunning is accomplished by selecting a combination of the parameters listed above. Other factors that affect the selection of a particular combination include wear, primary clutching, durability and cost.

What is claimed is:

1. A pulley assembly for use in an automobile accessory drive system, the pulley assembly comprising:
    a shaft engaging hub including an axis of rotation, an outer threaded surface, and a bore for receiving an accessory input shaft for engagement therewith;
    a pulley member including a bore that receives the shaft engaging hub, the pulley member including an inner coupling surface and an outer peripheral belt-engaging surface;
    a nut including an inner threaded surface that is engaged with the outer threaded surface of the shaft engaging hub, the nut also including an outer coupling surface that is angled relative to the axis of rotation of the shaft engaging hub; and
    a brake member interposed between the pulley member and the nut, the brake member being radially expandable outward toward the pulley member and including a first coupling surface in frictional contact with the outer coupling surface of the nut and a second coupling surface in frictional contact with the inner coupling surface of the pulley member;
    wherein, when the torque applied member is in a first direction, the brake member rotates with the pulley member, and, as a result of the frictional engagement of the first coupling surface of the brake member with the outer coupling surface of the nut, the brake member urges the nut to rotate and thereby travel the outer threaded surface of the shaft engaging member for axial translation of the nut into the brake member to radially expand the brake member outward toward the pulley member to frictionally couple the nut and brake member to the pulley member for rotation therewith.

2. The pulley assembly of claim 1, wherein rotation of the nut in a second direction opposite the first direction decouples the outer coupling surface of the nut from the first coupling surface of the brake member such that the nut and shaft engaging hub rotate relative to the pulley member.

3. The pulley assembly of claim 2, wherein the outer coupling surface of the nut and the first coupling surface of the brake member are cooperating friction surfaces that extend at an acute angle between approximately 5 and 45 degrees relative to the axis of rotation of the shaft engaging hub.

4. The pulley assembly of claim 3, wherein the outer coupling surface of the nut and the first coupling surface of the brake member extend at an angle between approximately 10 and 20 degrees relative to the axis of rotation of the shaft engaging hub.

5. The pulley assembly of claim 1, wherein the brake member comprises a plurality of arcuate brake shoes made of a composite of first and second materials, the second material located at the first and second coupling surfaces.

6. The pulley assembly of claim 5 wherein the first and second coupling faces comprise a brake material.

7. The pulley assembly of claim 1 further comprising an end cap coupled to the shaft engaging hub for rotation therewith, the end cap including a groove near its outer perimeter that receives a portion of the pulley member to define a debris-resistant nonlinear path between an interior and an exterior of the pulley assembly.

8. The pulley assembly of claim 1, further comprising:
a cover plate coupled to the shaft engaging hub for rotation therewith; and
a torsion spring having a first end engaged with the cover plate and a second end engaged with the nut;
wherein the torsion spring biases the nut to rotate in a first direction about the outer threaded surface of the shaft engaging hub.

9. The pulley assembly of claim 8, further comprising a bearing assembly having an inner race coupled to the shaft engaging hub and an outer race coupled to the pulley member to permit the shaft engaging hub to rotate relative to the pulley member when the first coupling surface of the brake member and the outer coupling surface of the nut decouple.

10. A pulley assembly for use in an automobile accessory drive system, the pulley assembly comprising:
a shaft engaging hub including an axis of rotation and an outer threaded surface;
a pulley member including an inner coupling surface and an outer peripheral belt-engaging surface;
a nut including an outer coupling surface and an inner threaded surface that is engaged with the outer threaded surface of the shaft engaging hub to form a threaded connection; and
a brake member interposed between the pulley member and the nut, the brake member including a first coupling surface in frictional contact with the outer coupling surface of the nut and a second coupling surface in frictional contact with the inner coupling surface of the pulley member, and being initially rotatable with the pulley member, relative to the shaft engaging hub, in a first direction until the brake member is radially expanded outward toward the pulley member by the axial travel of the nut as it rotates about the outer threaded surface of the shaft engaging hub;
wherein the outer coupling surface of the nut and the first coupling surface of the brake member are both angled between approximately 5 and 45 degrees relative to the axis of rotation of the shaft engaging hub.

11. The pulley assembly of claim 10 wherein the outer coupling surface of the nut and the first coupling surface of the brake member are both angled between approximately 10 and 20 degrees relative to the axis of rotation of the shaft engaging hub.

12. The pulley assembly of claim 10 wherein the first coupling surface of the brake member is not parallel to the second coupling surface of the brake member.

13. The pulley assembly of claim 12 wherein the inner coupling surface of the pulley member is approximately parallel to the axis of rotation of the shaft engaging hub.

14. The pulley assembly of claim 10 further comprising:
a cover plate coupled to the shaft engaging hub for rotation therewith; and
a torsion spring having a first end engaged with the cover plate and a second end engaged with the nut.

15. The pulley assembly of claim 14 wherein the cover plate includes an axially extending, outer circumferential flange that surrounds a portion of the pulley member to define a non-linear path between an interior and exterior of the pulley assembly.

16. The pulley assembly of claim 10 wherein the brake member is formed from a first material and the first coupling surface is coated with a second material.

17. A pulley assembly for use in an automobile accessory drive system, the pulley assembly comprising:
a hub having an axis of rotation, an outer threaded surface, and a shoulder extending outward, away from the axis of rotation, a distance greater than the threaded surface;
a nut having an inner threaded surface and an outer friction bearing surface, the inner threaded surface threadably engaged with the outer threaded surface of the hub;
a pulley member having an inner friction bearing surface and an outer belt engaging surface; and
a brake member having a first surface in frictional contact with the outer friction bearing surface of the nut, a second surface in frictional contact with the inner friction bearing surface of the pulley member, and an inner ledge, extending toward the axis of rotation, in frictional contact with the shoulder of the hub.

18. The pulley assembly of claim 17, wherein rotation of the nut in a first direction about the axis of rotation causes the nut to translate along the axis of rotation toward the brake member via threaded engagement with the hub so as to increase frictional force between the outer friction bearing surface of the nut and the first surface of the brake member, and wherein rotation of the nut in a second direction opposite the first direction causes the nut to translate away from the brake member so as to decrease frictional force between the out friction bearing surface of the nut and the first surface of the brake member.

19. The pulley assembly of claim 18, further comprising a cover plate coupled to the hub for rotation therewith; and a torsion spring having a first end engaged with the cover plate and a second end engaged with the nut, wherein the torsion spring resists rotation of the nut in the second direction.

20. The pulley assembly of claim 18, wherein the outer friction bearing surface of the nut forms an acute angle with the axis of rotation of between approximately 5 to 45 degrees.

21. The pulley assembly of claim 17, wherein the brake member comprises a plurality of arcuate brake shoes positioned around the nut, each brake shoe movable in a radial direction in response to axial movement of the nut along the threaded surface.

22. A method of manufacturing a pulley assembly for use in an automobile accessory drive system, the method comprising the steps of:
   providing a shaft engaging hub including an axis of rotation, an outer threaded surface, and a bore for receiving an accessory input shaft for engagement therewith;
   providing a pulley member including a bore that receives the shaft engaging hub, the pulley member including an inner coupling surface and an outer peripheral belt-engaging surface;
   providing a nut including an inner threaded surface that is engaged with the outer threaded surface of the shaft engaging hub, the nut also including an outer coupling surface that is angled relative to the axis of rotation of the shaft engaging hub;
   providing a brake member interposed between the pulley member and the nut, the brake member being initially rotatable with the pulley member, relative to the shaft engaging hub, in a first direction until the brake member is radially expanded outward toward the pulley member by the axial travel of the nut as it rotates about the outer threaded surface of the shaft engaging hub and including a first coupling surface in frictional contact with the outer coupling surface of the nut and a second coupling surface in frictional contact with the inner coupling surface of the pulley member;
   selecting a thread pitch of the outer threaded surface of the hub, selecting a friction material located at the first coupling surface of the brake member, and selecting the angle formed between the outer coupling surface of the nut and the axis of rotation of the hub such that the pulley assembly is operable as a clutch to disengage the hub from the pulley member for rotation of the hub in one direction relative to the pulley member.

23. The method of claim 22, further comprising selecting the thread pitch, the friction material located at the first coupling surface of the brake member, and the angle between the outer coupling surface of the nut and the axis of rotation in combination to minimize the torque needed to disengage the hub from the pulley member for relative rotation.

24. The method of claim 22, further comprising selecting a coefficient of friction between the first coupling surface of the brake member and the outer coupling surface of the nut.

* * * * *